United States Patent
Guillard et al.

(10) Patent No.: US 12,146,594 B2
(45) Date of Patent: Nov. 19, 2024

(54) CONNECTING DEVICE WITH CONNECTION INDICATOR

(71) Applicant: PARKER HANNIFIN EMEA SARL, Etoy (CH)

(72) Inventors: Philippe Guillard, Saint-Gregoire (FR); Jean-François Vallet, Janze (FR); Philippe Le Quere, Betton (FR)

(73) Assignee: PARKER HANNIFIN EMEA SARL, Etoy (CH)

( * ) Notice: Subject to any disclaimer, the term of this patent is extended or adjusted under 35 U.S.C. 154(b) by 183 days.

(21) Appl. No.: 17/791,986

(22) PCT Filed: Jan. 15, 2021

(86) PCT No.: PCT/EP2021/050870
§ 371 (c)(1),
(2) Date: Jul. 11, 2022

(87) PCT Pub. No.: WO2021/144459
PCT Pub. Date: Jul. 22, 2021

(65) Prior Publication Data
US 2023/0042410 A1    Feb. 9, 2023

(30) Foreign Application Priority Data
Jan. 16, 2020   (FR) .................................... 2000410

(51) Int. Cl.
*F16L 37/00*    (2006.01)
*F16L 37/091*   (2006.01)

(52) U.S. Cl.
CPC ......... *F16L 37/091* (2013.01); *F16L 2201/10* (2013.01)

(58) Field of Classification Search
CPC .................................................. F16L 2201/10
See application file for complete search history.

(56) References Cited

FOREIGN PATENT DOCUMENTS

| | | | | |
|---|---|---|---|---|
| FR | 2890149 A1 | * | 3/2007 | ............ F16L 25/01 |
| FR | 3072755 B1 | * | 10/2019 | ............ F16L 37/084 |
| JP | H07 35281 A | | 2/1995 | |
| JP | 2001221386 A | | 8/2001 | |
| JP | 2001324071 A | * | 11/2001 | ............ F16L 37/091 |
| JP | 2001349488 A | | 12/2001 | |
| JP | 2002089759 A | * | 3/2002 | ............ F16L 19/065 |

(Continued)

OTHER PUBLICATIONS

International Search Report and Written Opinion of the International Searching Authority for corresponding International Patent Application No. PCT/EP2021/050870, mailed Apr. 15, 2021.

*Primary Examiner* — Zachary T Dragicevich
*Assistant Examiner* — James A Linford
(74) *Attorney, Agent, or Firm* — Renner, Otto, Boisselle & Sklar, LLP

(57) ABSTRACT

A device for connecting a tube end section includes a tubular body defining a channel provided with a retainer including a hooking element for engaging an outer surface of the tube end section and an annular seal for gripping the outer surface of the tube end section. The device includes at least a first arm having an end arranged in the channel to be actuated by the tube end section downstream of the retainer to make a portion of the arm a connection control that which is detectable from outside the body.

6 Claims, 15 Drawing Sheets

(56) References Cited

FOREIGN PATENT DOCUMENTS

| JP | 2006183764 A | * | 7/2006 | ............ F16L 19/065 |
| JP | 2009019645 A | * | 1/2009 | .......... F16L 37/0925 |
| JP | 2011033056 A | | 2/2011 | |
| WO | 2018/224588 A1 | | 12/2018 | |

* cited by examiner

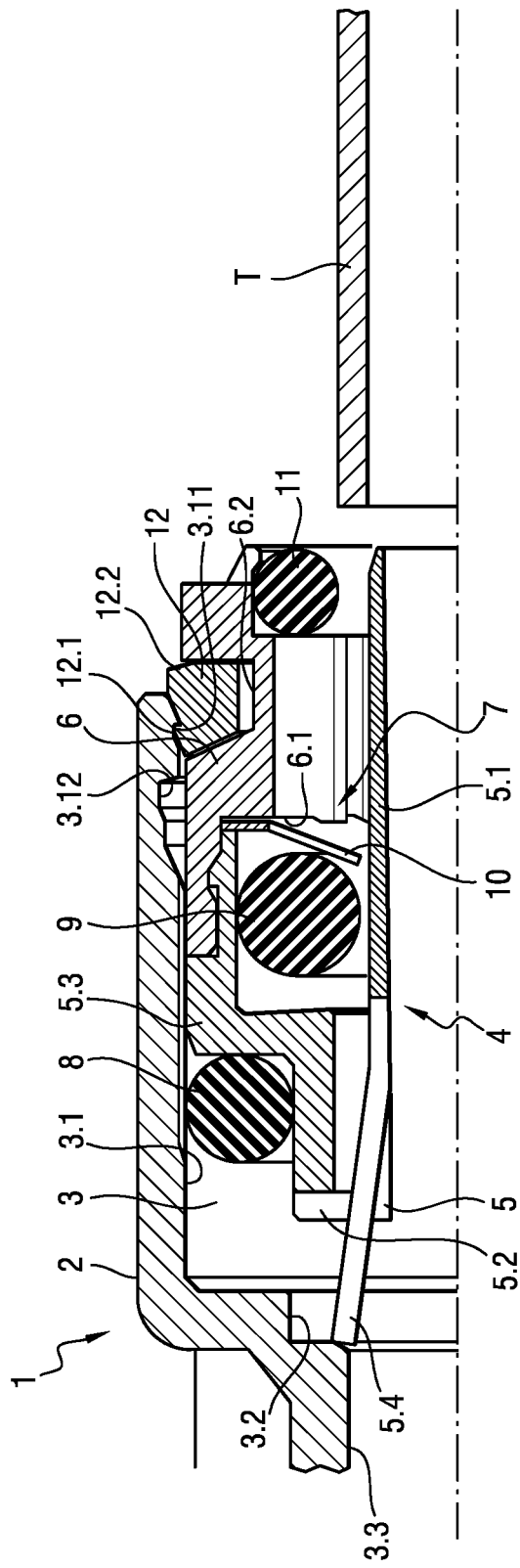
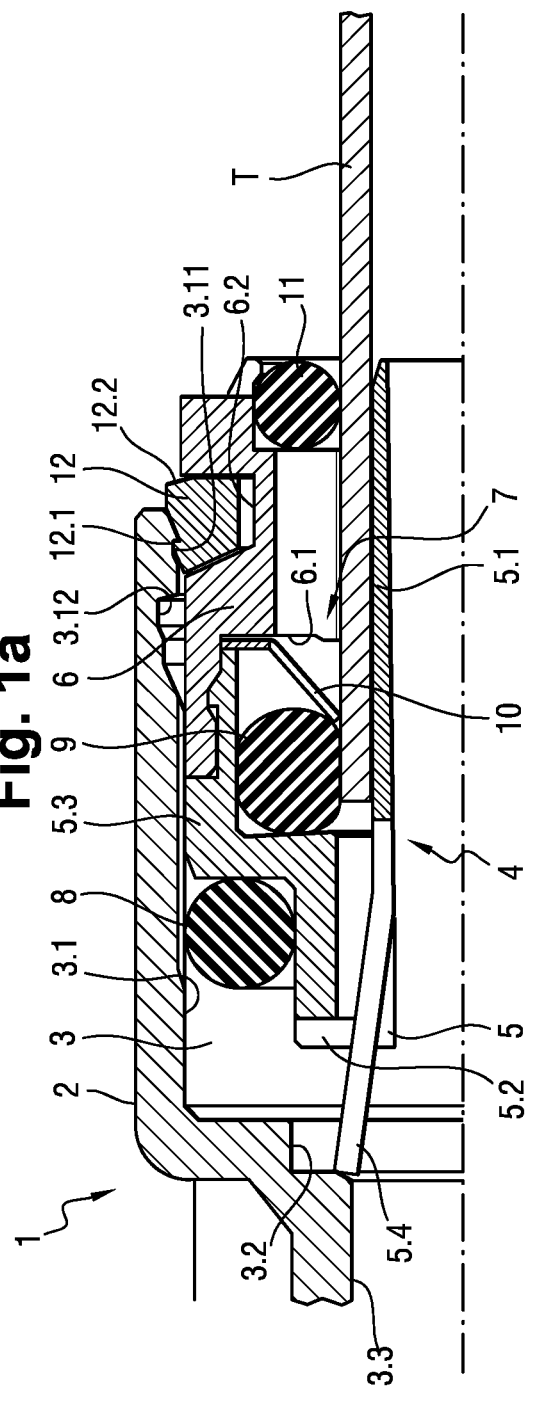
Fig. 1a
Fig. 1b

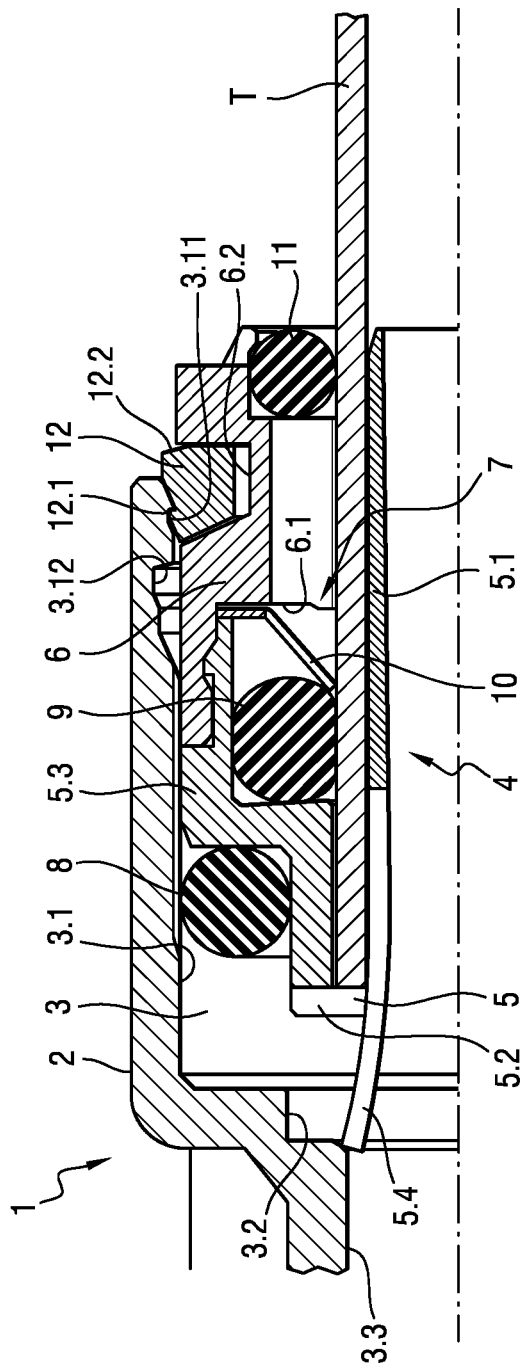
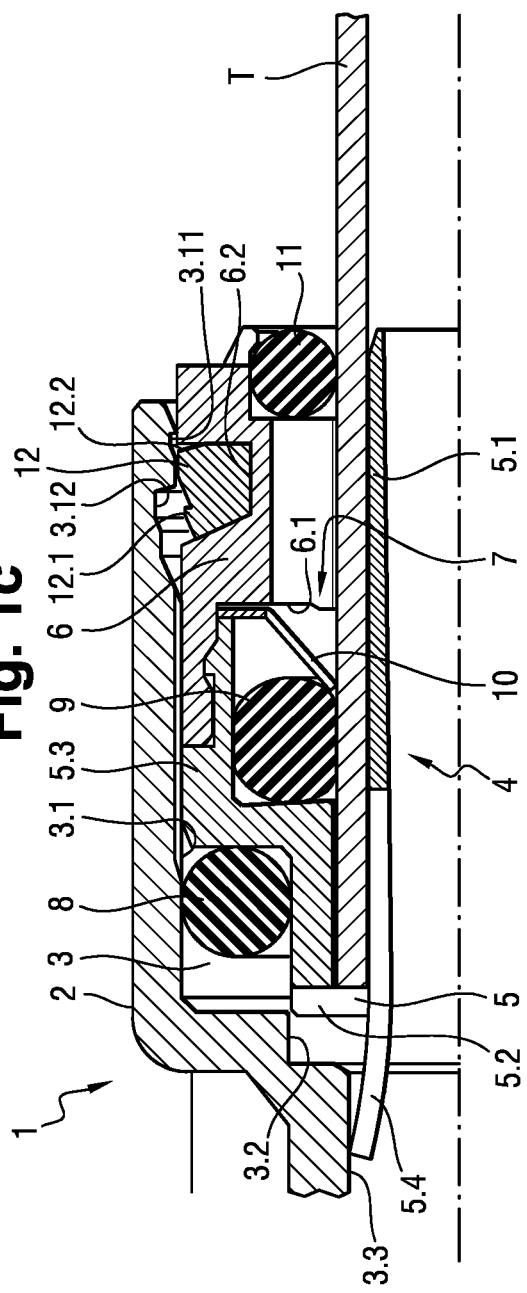

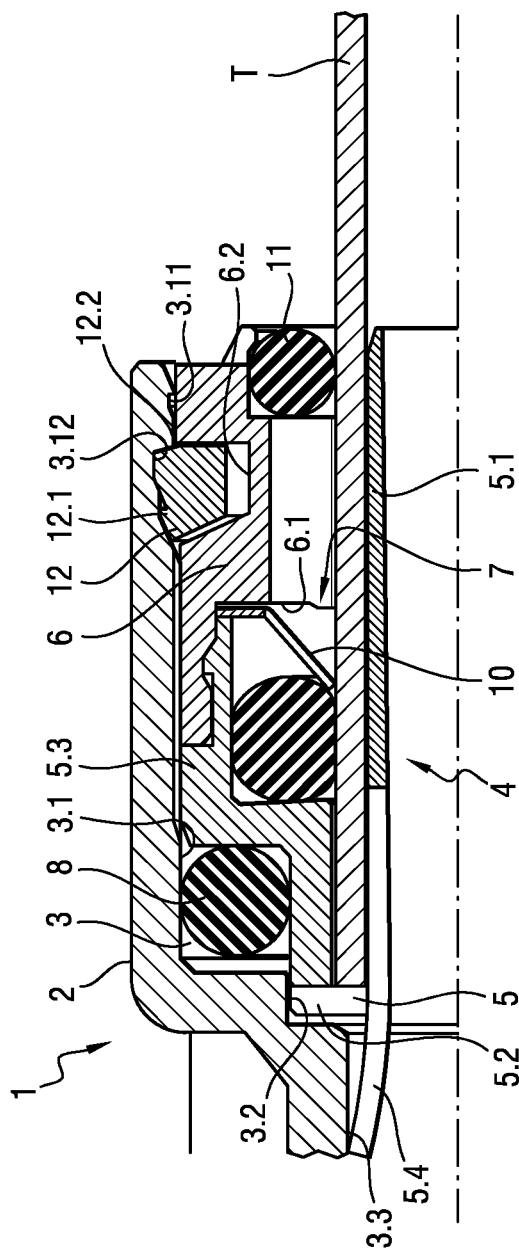
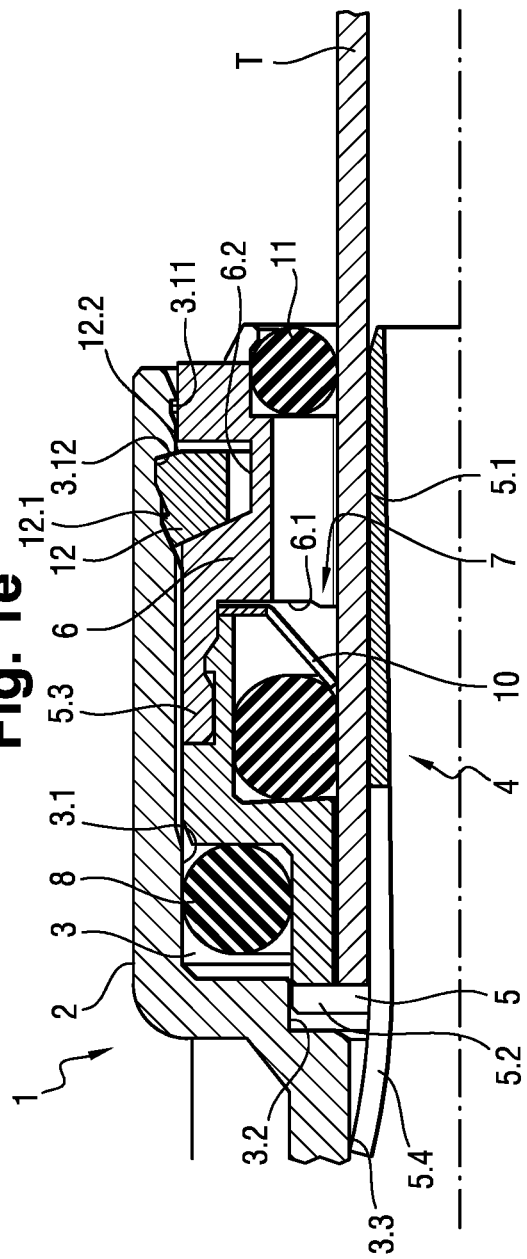
Fig. 1e
Fig. 1f

CONNECTING DEVICE WITH CONNECTION INDICATOR

This application is a national phase of International Application No. PCT/EP2021/050870 filed Jan. 15, 2021, which claims priority to FR Application No. 2000410 filed Jan. 16, 2020, each of which is hereby incorporated herein by reference in its entirety.

BACKGROUND OF THE INVENTION

The present invention relates to the field of fluid transport circuits, in particular in motor vehicles, such as lorries, like for example, hydraulic braking circuits.

It is known to connect a tube to another element (other tube, dispenser, actuator, valve, etc.) of a pressurised fluid transport circuit by means of a connection device comprising a body defining a channel having a first section arranged to receive an end portion of the tube and a second section connected to said other element. Conventionally, the first section is provided internally with means for securing the tube end portion in the channel, in a sealed manner. These means generally comprise a fastening element such as a clamp, a slotted circlip or an internal tooth washer, and a sealing element such as an annular seal to be compressed between an outer surface of the tube and an inner surface of the channel.

A leakage of the connection device irremediably leads to a decrease on the pressure of the fluid circulating in the circuit, which can prove to be dangerous and lead to serious damage, in particular in a circuit of a vehicle braking system where the pressure decrease risks making said braking system inoperable.

It seems that the presence of a leakage in the fluid transport circuits is often due to an incorrect assembly of the tube with the connection device. It is indeed common that the tube is not sufficiently press-fitted in the body of the connection device to be engaged in the sealing element. An incorrect press-fitting generally occurs, because it is not easy to distinguish during press-fitting, the insertion of the tube in the fastening element, the insertion of the tube in sealing element, and finally the arrival of the stopped tube, to be assumed that there is one of them. This is all the more difficult, that there are numerous types of connectors which bring into play different forces and give the operator different sensations.

It is therefore advantageous to have a tube connection end control in order to be sure that the tube is sufficiently press-fitted in the connector to guarantee the sealing of the connection device.

A solution consists of making a mark on the outer surface of the tube, which is concealed by the body of the connector when the tube is sufficiently press-fitted in the connector. This solution therefore assumes that the operator thinks about making said mark on the tube, since otherwise they will think that the tube is correctly connected, while it is not sufficiently press-fitted in the body of the device to cooperate with the retaining means.

OBJECT OF THE INVENTION

The invention therefore aims to propose a connection device enabling to obviate, at least partially, the abovementioned problems.

SUMMARY OF THE INVENTION

To this end, the invention provides a connecting device of a tube end section, the device comprising: a tubular body defining a channel provided with retaining means, including a hooking element for engaging an outer surface of the tube end section, and an annular seal for sandwiching the outer surface of the tube end section. The device comprises at least a first arm having an end arranged in the channel to be actuated by the tube end section downstream of the retaining means to make a portion of the arm a connection control which is detectable from outside the body.

Thus, while ensuring a sealing on the outside of the tube, the invention makes it possible to refer the operator that the connection is effective and that he can cease his effort of inserting the tube into the body of the device.

Other characteristics and advantages of the invention appear on reading the following description of a particular and non-limiting embodiment of the invention.

BRIEF DESCRIPTION OF THE DRAWING

Reference is made to the accompanying drawings, in which:

FIG. 1a is a longitudinal cross-sectional view of a connection device according to a first embodiment of the invention, awaiting a tube;

FIG. 1b is a longitudinal cross-sectional view of the connection device according to the first embodiment of the invention, at the start of connecting a tube;

FIG. 1c is a longitudinal cross-sectional view of the connection device according to the first embodiment of the invention, after a first recess stroke of the tube;

FIG. 1d is a longitudinal cross-sectional view of the connection device according to the first embodiment of the invention, after a second recess stroke of the tube;

FIG. 1e is a longitudinal cross-sectional view of the connection device according to the first embodiment of the invention, at the end of the connection of the tube;

FIG. 1f is a longitudinal cross-sectional view of the connection device according to the first embodiment of the invention, after the pressurising of the circuit;

DETAILED DESCRIPTION OF THE INVENTION

Figure 2A:
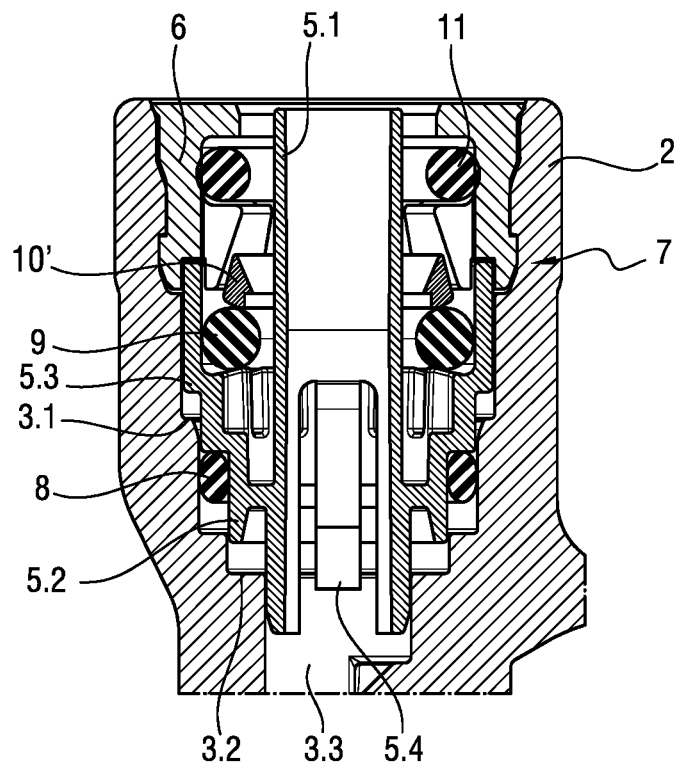
FIG. 2a is a partial view of a connection device according to a second embodiment of the invention, awaiting a tube, represented as a longitudinal cross-section according to a first section plane.
Figure 2B:
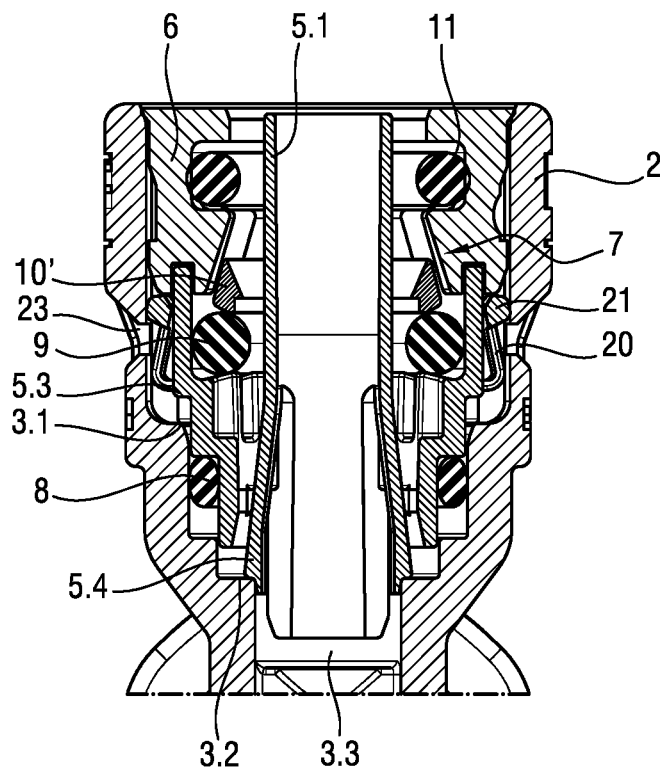
FIG. 2b is a partial view of the connection device according to the second embodiment of the invention, awaiting a tube, represented as a longitudinal cross-section according to a second section plane perpendicular to the first section plane.

The invention is, in this case, described in application to the connection of a tube T to a fluid transmitter and/or receiver element belonging to a fluid transport circuit which cannot be seen in the figures. Said circuit element can be another tube, a dispenser, a pump, a reservoir, an actuator like a jack or a motor, or any other element of a fluid transport circuit.

In reference to FIG. 1, and according to the first embodiment of the invention, the connection device, generally referenced in 1, comprises a tubular body 2 axially divided into a connection section at an end section of the tube T and a connection section at the circuit element. The tubular body 2 defines a channel 3 successively comprising an inlet section 3.1 connected via a counterbore 3.2 to a main section 3.3 intended to be in communication with a channel of the circuit element.

A movable assembly generally referenced in 4 is mounted in the inlet section 3.1. The movable assembly 4 comprises a bushing 5 and an insert 6 receiving retaining means 7 for securing the tube end section in the channel 3, in a sealed manner.

The movable assembly 4 can slide between a standby position (FIG. 1a, b, c) in which the bushing 5 is spaced apart from a bottom of the counterbore 3.2 forming a stop at its recess in the channel 3 and a recessed operating position (FIG. 1d, e, f) in which the bushing 5 presses against the bottom of the counterbore 3.2.

The bushing 5 comprises an internal socket 5.1 connected by a collar 5.2 to an external socket 5.3 coaxial to the internal socket 5.1. The collar 5.2 extends facing the bottom of the counterbore 3.2.

The internal socket 5.1 has a first end in the vicinity of a free end of the insert 6 and a second end, in this case, connected to the collar 5.2. The second end of the internal socket 5.1 is extended beyond the collar 5.2 by two legs 5.4 diametrically opposite, pressing against the bottom of the counterbore 3.2 when the movable assembly 4 is in the standby position to oppose the movement of the movable assembly 4 toward the operating position. More specifically, the legs 5.4 press against a chamfer arranged in the bottom of the counterbore 3.2 around the outlet of the main section 3.3.

The external socket 5.3 comprises:
  a part of a smaller diameter (slightly less than the diameter of the counterbore 3.2) which is connected to the end collar 5.2 and which supports an annular seal 8, elastically radially compressible, to ensure the sealing between the wall of the inlet section 3.1 of the channel 3 and the outer surface of the part of the smaller diameter;

a part of a greater diameter (slightly less than the diameter of the inlet section 3.1) which is connected to the part of a smaller diameter, which is engaged in an end of the insert 6 opposite its free end and which is provided internally with an annular seal 9, elastically radially compressible, to ensure the sealing between the outer surface of the tube T and the inner surface of the part of a greater diameter.

The insert 6 is provided internally with a shoulder 6.1 which confines a fastening washer 10, internally teethed, with the free end of the external socket 5.3 and a dust-resistant annular seal 11 blocked in the free end of the insert 6 facing the free end of the internal socket 5.1 to prevent the passage of dust between the tube T and the inner surface of the insert 6.

The insert 6 is further externally provided with a groove 6.2 receiving an anchoring element 12 of annular shape such that:

when the movable assembly 4 is in the standby position, the free end of the insert 6 and the anchoring element 12 extending parallel to the outside projecting from the channel 3;

when the movable assembly 4 is in the operating position, the free end of the insert 6 is flush with the body 2 and the anchoring element 12 is totally received in the channel 3.

The anchoring element 12 comprises:

a first external step 12.1 arranged to be received in a first housing 3.11 of the inlet section 3.1 when the movable assembly 4 is in the standby position to oppose an extraction of the movable assembly 4 outside of the channel 3; and a second external step 12.2, higher than the first step 12.1 and arranged upstream from this by reference to the direction of insertion of the tube T in the channel 3, arranged to be received in a second housing 3.12 of the inlet section 2.1 when the movable assembly 4 is in the operating position so as to oppose an extraction of the movable assembly 4 outside of the channel 3.

The anchoring element 12 is thus arranged to oppose an extraction of the insert outside of the channel 3 in each of the positions of the movable assembly 4 and therefore of the bushing 5.

The anchoring element 12 is an annular slotted circlip which can be elastically deformed in a rest state in which the second step 12.2 has an outer diameter greater than the inner diameter of the second housing 3.12 and a deformed state in which the second step 12.2 has an inner diameter less than the inner diameter of the inlet section 3.1. The first step 12.1 and the second step 12.2 have a downstream surface (by reference to the direction of insertion of the tube T in the channel 3) inclined to facilitate the elastic deformation of the anchoring element 12 and the recessing of the movable element 4 in the channel 3 and an upstream surface (by reference to the direction of insertion of the tube T in the channel 3), radial or quasi-radial to oppose the extraction of the movable assembly 4 outside of the channel 3 by cooperating with a homologous surface of the housings 3.11, 3.12 respectively.

Before any connection (FIG. 1a), the movable assembly 4 is in the standby position and the anchoring element 12 is partially projecting from the channel 3, the first step 12.1 being received in the first housing 3.11.

At the start of the connection, the end section of the tube T is simultaneously engaged on the free end of the internal socket 5.1 and in the dust-resistant seal 11, the movable assembly 4 being held in the standby position by the legs 5.4 pressing against the bottom of the counterbore 3.2 in the vicinity of the outlet of the main section 3.3.

The recessing force of the tube T being continued, the end section of the tube T passes into the fastening washer 10 and into the seal 9 (FIG. 1b), the movable assembly 4 being held in the standby position by the legs 5.4 pressing against the bottom of the counterbore 3.2.

The recessing force of the tube T being continued, the end section of the tube T progressively covers the legs 5.4 and tends to elastically deform them to fold them back toward the central axis of the body 2 (FIG. 1c), until forcing the folding back of the legs 5.4 which thus avoid being pressed against the bottom of the counterbore 3.2 and will return into the main section 3.3. This folding back of the legs 5.4 enables the movement of the movable assembly 4 toward the operating position (FIG. 1d). Simultaneously, the anchoring element 12 is elastically deformed due to the sliding of the steps 12.1, 12.2 against the body 2 like cams, and is located between the housings 3.11 and 3.12. The movement of the movable assembly 4 is relatively sudden and ends when the bushing 5 stops against the bottom of the counterbore 3.2 (FIG. 1e). The second step 12.2 thus arrives facing the second housing 3.12 and has penetrated there under the effect of the elasticity of the anchoring element 12 which has flattened the second step 12.2 against the bottom of the second housing 3.12. It is understood that, the legs 5.4 extending downstream from the retaining means 7 (i.e. downstream from the seal 9 and from the anchoring washer 10) by reference to the direction of insertion of the end section of the tube T in the body 2, the movable assembly 4, and therefore the bushing 5, only moves toward the operating position, once the tube T section is in a correct connection position with respect to the retaining means 7.

The arrival of the bushing 5 in the second recessing position thus activates at least one connection control. In this first embodiment, there are several connection controls:

the bushing 5 and the body 2 are made of materials such that the arrival of the bushing 5 stopped against the bottom of the counterbore 3.2 (in the operating position) causes a sound constituting a connection control;

the anchoring element 12 extends projecting from the body 2 when the movable assembly 4 (and therefore the bushing 5) is in the standby position and is received completely in the body 2 when the movable assembly 4 is in its operating position such that the anchoring element 12 constitutes both a tactile connection control and a visual connection control. The anchoring element 12 and the body 2 preferably have contrasting colours to strengthen the visual signal constituted by the retraction of the anchoring element 12 in the body 2;

due to the height of the second step 12.2 (greater than the depth of the second housing 3.12) and the elasticity of the anchoring element 12, the second external step 12.2 strikes the bottom of the second housing 3.12 when the movable element 4 arrives in its operating position. The anchoring element 12 and the body 2 are made of materials such that the arrival of the second external step 12.2 against the bottom of the second housing 3.12 causes a sound constituting a connection control.

Upon pressurising the circuit, the tube T will slightly go backward under the effect of the fluid pressure, but will be held in the insert 6 by the fastening washer 10 while the insert 6 will be held in the body 2 by the anchoring element 12. The groove 6.2 receiving the anchoring element 12 has an inclined downstream flank and a substantially radial upstream flank, the free edges of which define a opening wider than the bottom of the groove 6.2. The anchoring element 12 has, facing the flanks of the groove 6.2, downstream and upstream faces having inclinations, homologous to those of the flanks facing which they are located such that, when an extraction force is exerted on the tube T, the cooperation of the downstream flank of the groove 6.2 with the downstream face of the anchoring element 12 tends to make the anchoring element 12 project outside of the recess 6.2, thus strengthening the holding of the insert 6 in the channel 3.

Element identical or similar to those described above will have a numerical reference identical to the latter in the following description of the second and third embodiments in relation to FIGS. 2 to 13.

In reference to FIGS. 2 to 4, the connection device 1 according to the second embodiment comprises, as above: a body 2, a bushing 5, an insert 6, seals 8, 9 and 11.

This connection device has two main differences with respect to the first embodiment:
  the insert 6 is fixed, only the bushing 5 is movable between the standby position and the operating position which are the same as above;
  the insert 6 has no connection control and only the bushing 5 is provided with connection controls.

The external socket 5.3 of the bushing 5 is, in this case, provided with two side arms 20 having a free end 21 provided with a bulge. The side arms 20 are diametrically opposite one another and are elastically deformable from a deformed state, in which the free ends are close to the internal socket 5.1 and a rest state, in which the free ends are spaced apart from the internal socket 5.1.

The body 2 is provided with two orifices 23 intended to receive the bulges of the free ends 21 when the bushing 5 is in its operating position.

Secondarily, the internally-toothed fastening washer 10 has been replaced by a slotted hooking ring 10', intended to sandwich the end section of the tube T and the shoulder 6.1 has a truncated shape to favour a clamping of the hooking ring 10' on the end section of the tube T when an extraction force is exerted on the tube T. The hooking ring 10' is elastically deformable and comprises an internal projection to overlap the outer surface of the end section of the tube T.

Thus, before any connection (FIG. 2a, 2b), the bushing 5 is in the standby position and the arms 20 are held in a deformed state by the bulges of the free ends 21 pressing against the wall of the inlet section 3.1 of the channel 3.

As above, at the start of the connection, the end section of the tube T is simultaneously engaged on the free end of the internal socket 5.1 and in the dust-resistant seal 11, the bushing 5 being held in the standby position by the legs 5.4 pressing against the bottom of the counterbore 3.2 in the vicinity of the outlet of the main section 3.3.

The recessing force of the tube T is continued, the end section of the tube T passes into the hooking ring 10' and in the seal 9, the bushing 5 being held in the standby position by the legs 5.4 pressing against the bottom of the counterbore 3.2.

Figure 3A:
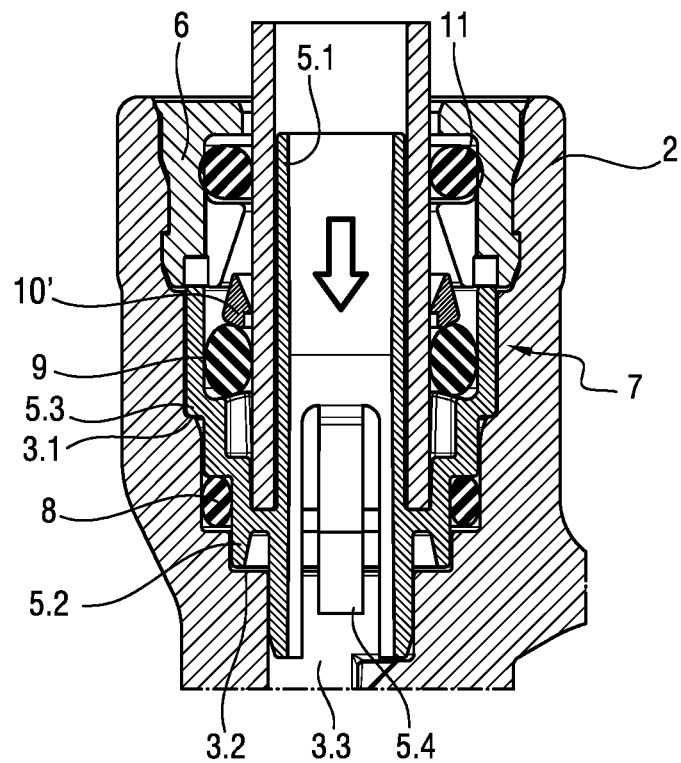
FIG. 3a is a partial view of the connection device according to the second embodiment of the invention, at the end of connection of the tube, represented as a longitudinal cross-section according to a first section plane.
Figure 3B:
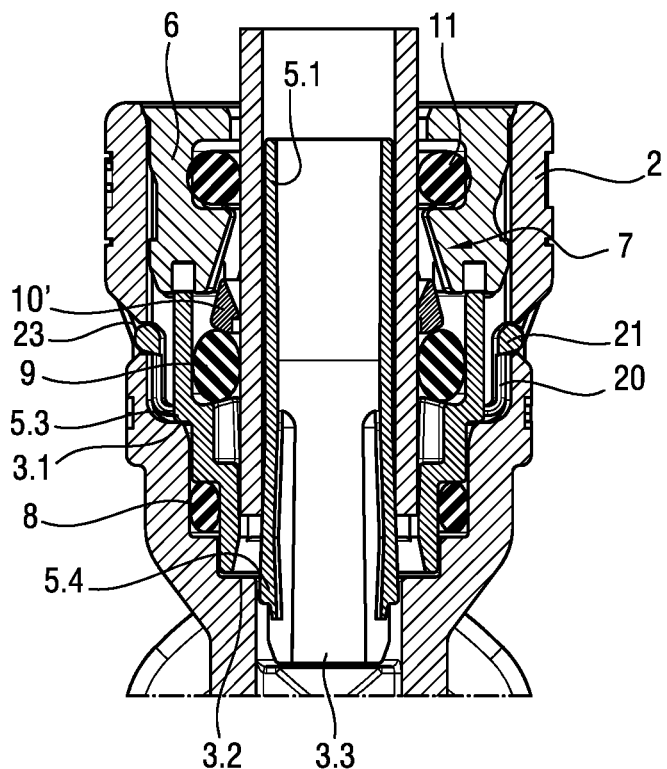
FIG. 3b is a partial view of the connection device according to the second embodiment of the invention, at the end of connection of the tube, represented as a longitudinal cross-section according to a second section plane perpendicular to the first section plane.
Figure 4A:
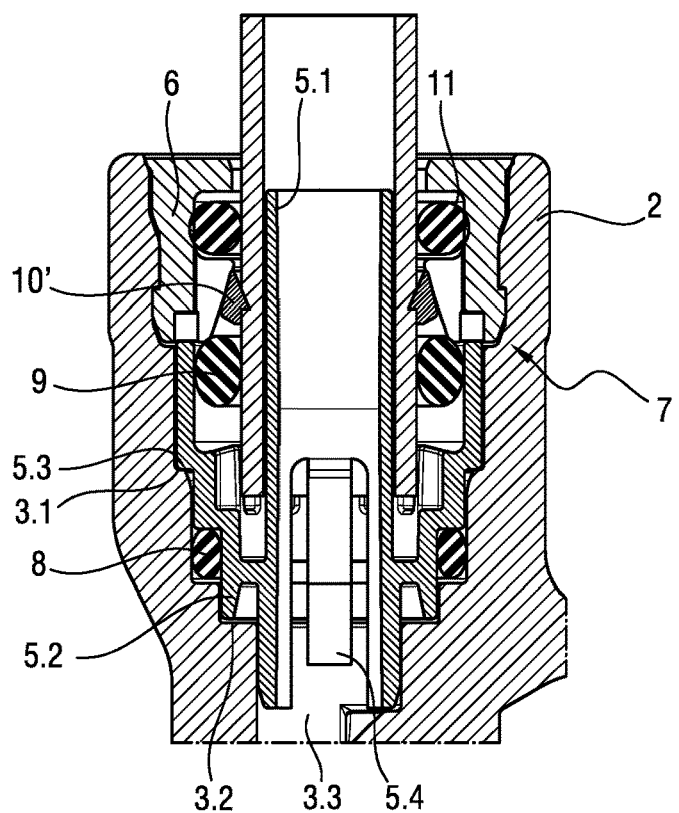
FIG. 4a is a partial view of the connection device according to the second embodiment of the invention, after the pressurising of the circuit, represented as a longitudinal cross-section according to a first section plane.
Figure 4B:
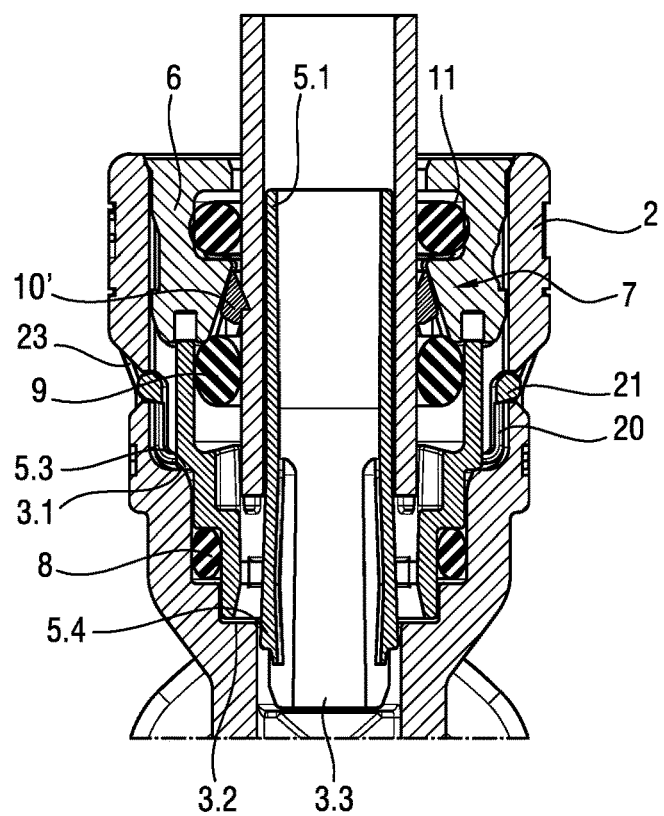
FIG. 4b is a partial view of the connection device according to the second embodiment of the invention, after the pressurising of the circuit, represented as a longitudinal cross-section according to a second section plane perpendicular to the first section plane.
Figure 5A:
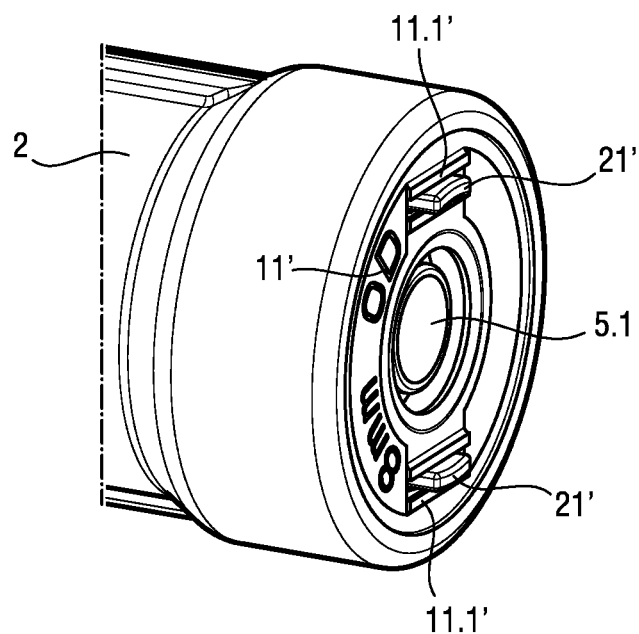
FIG. 5a is a partial view of a connection device according to third embodiment of the invention, awaiting a tube, represented as a perspective.
Figure 5B:
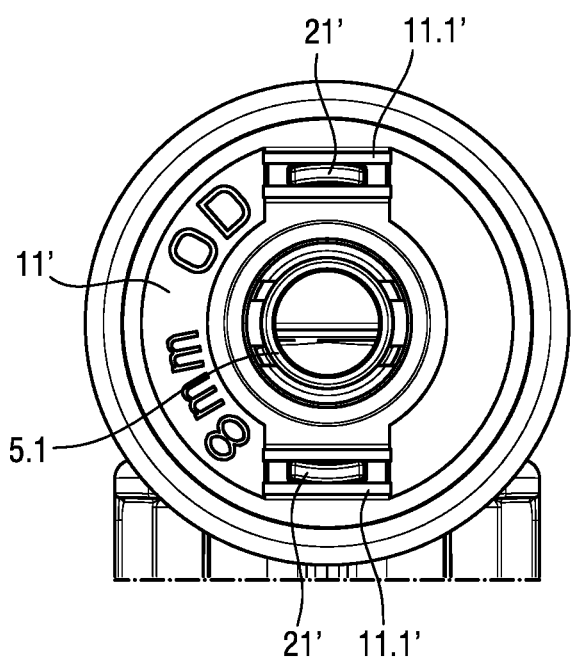
FIG. 5b is a partial view of the connection device according to the third embodiment of the invention, awaiting a tube, represented as a front view.
Figure 5C:
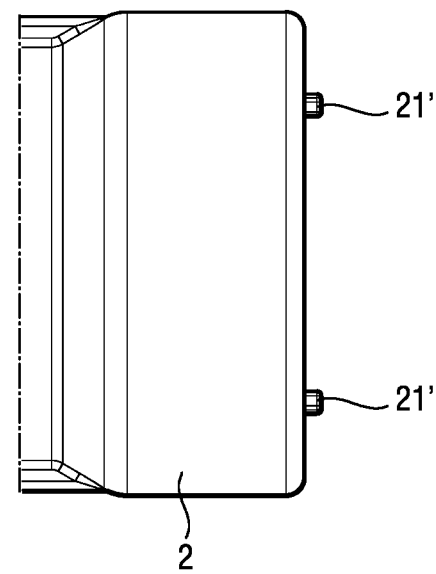
FIG. 5c is a partial view of the connection device according to the third embodiment of the invention, awaiting a tube, represented as a side view.

The recessing force of the tube T being continued, the end section of the tube T progressively covers the legs 5.4 and tends to elastically deform them to fold them back toward the central axis of the body 2, until forcing the folding back of the legs 5.4 which thus escape, pressing against the bottom of the counterbore 3.2 and return into the main section 3.3. This folding back of the legs 5.4 enables the movement of the bushing 5 toward the operating position. The movement of the bushing 5 is relatively sudden and ends when the bushing 5 stops against the bottom of the counterbore 3.2 (FIGS. 3a and 3b). Simultaneously, the bulges of the free ends 21 of the arms 20 arrive facing the orifices 23 and have penetrated there under the effect of the elasticity of the arms 20. In doing this, the arms 20 come back into contact against the edge of the orifices 23. The free end 21 is thus movable between a retracted position in which the free end 21 is concealed from the outside of the body 2 and a visible position, in which the free end 21 can be seen from the outside of the body 2.

As above, the arrival of the bushing 5 in the second recessing position activates at least one connection control. In this second embodiment, there are several connection controls:
  the bushing 5 and the body 2 are made of materials such as the arrival of the bushing 5 stopped against the bottom of the counterbore 3.2 (in the operating position) causes a sound constituting a sound connection control;
  the bulges of the free ends 21 are received in the orifices 23 and can be seen from the outside through the orifices 23 when the bushing 5 is in the operating position, while they do not appear when the bushing 5 is in the standby position. Thus, the bulges of the free ends 21 constitute a visual connection control. The arms 21 and the body 2 preferably have contrasting colours to strengthen the visual signal constituted by the appearance of bulges in the orifices 23;
  due to the height of the bulge of the free end 21 of the arms 20 and of the elasticity of the arms 20, the arms 20 in the vicinity of their free end 21 suddenly strike the wall of the end section 3.1 when the bushing 5 arrives in its operating position. The arms 20 and the body 2 are made of materials such as the impact of the arms 20 against the wall of the inlet section 3.1 causes a sound constituting a sound connection control.

Upon pressurising the circuit, the tube T will slightly go backward under the effect of the fluid pressure, but will drive the hooking ring 10' which will slide against the truncated surface of the shoulder 6.11 increasing the clamping of the slotted ring 10' on the tube T (FIG. 4a, 4b) and the insert 6 will oppose the extraction of the tube T.

In reference to FIGS. 5 to 13, the connection device 1 according to the third embodiment comprises, as above: a body 2, a bushing 5, an insert, and seals 8, 9.

The connection device according to the third embodiment has two main differences with respect to the second embodiment:
  the side arms 20 are replaced by first axial arms 20';
  the dust-resistant seal 11 is replaced by a dust-resistant seal 11' having a different shape.

Furthermore, in the third embodiment, the insert 6' is fixed in the inlet of the channel 3 like in the second embodiment, but has a structure different from that of the second embodiment.

The external socket 5.3 of the bushing 5 has a free end, of which two first axial arms 20' having a free end 21' are integral. The first axial arms 20' are diametrically opposite one another and pass through the insert 6' in bores 6.4' such that their free ends 21' extend axially projecting from the face 6.3' of the insert 6' through openings 6.5' when the bushing 5 is in the standby position (FIGS. 5 and 7) and are retracted when the bushing 5 is in the operating position (FIGS. 6 and 8).

Figure 6A:
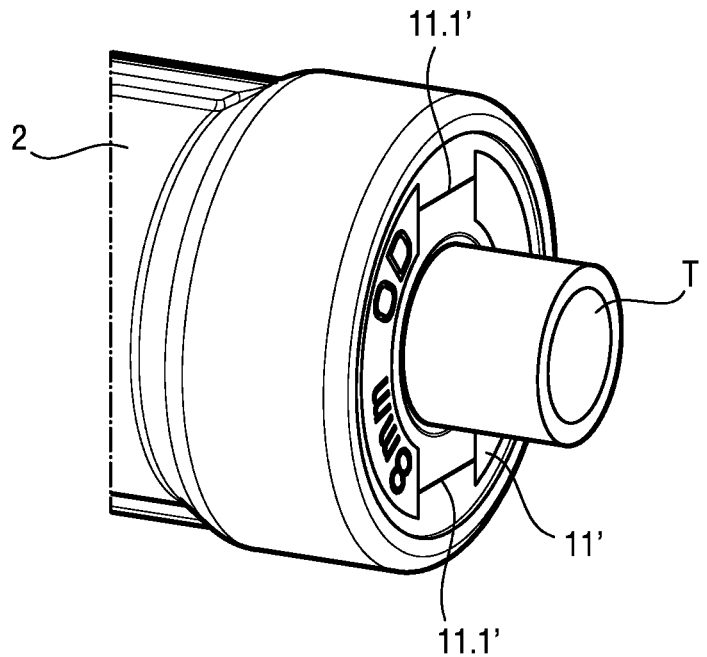
FIG. 6a is a partial view of the connection device according to the third embodiment of the invention, after connection of a tube, represented as a perspective.
Figure 6B:
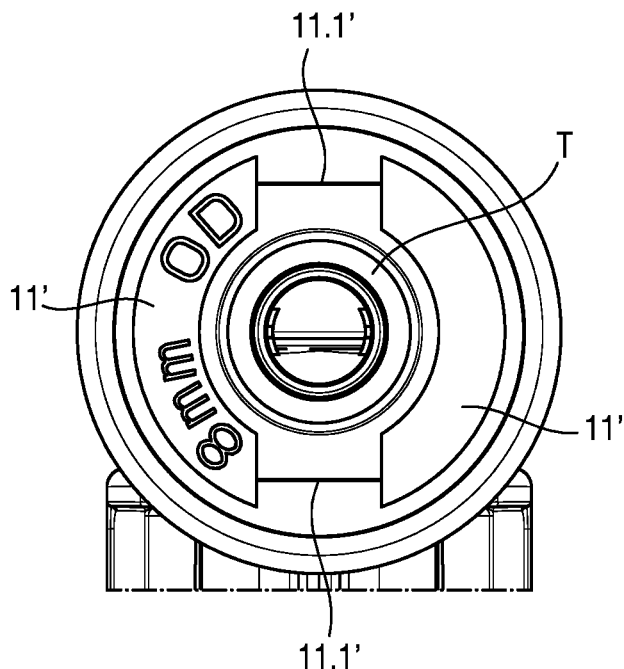
FIG. 6b is a partial view of the connection device according to the third embodiment of the invention, after connection of a tube, represented as a front view.
Figure 6C:
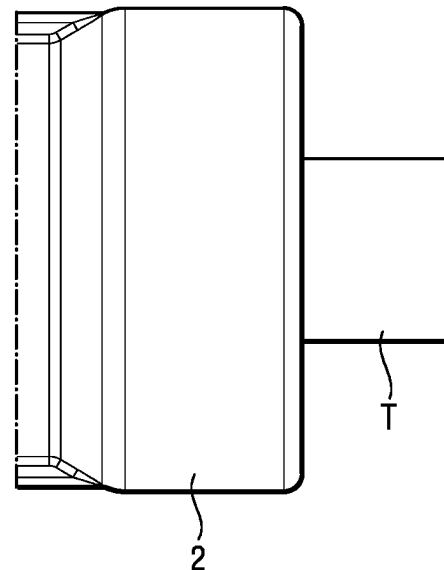
FIG. 6c is a partial view of the connection device according to the third embodiment of the invention, after connection of a tube, represented as a side view.
Figure 7A:
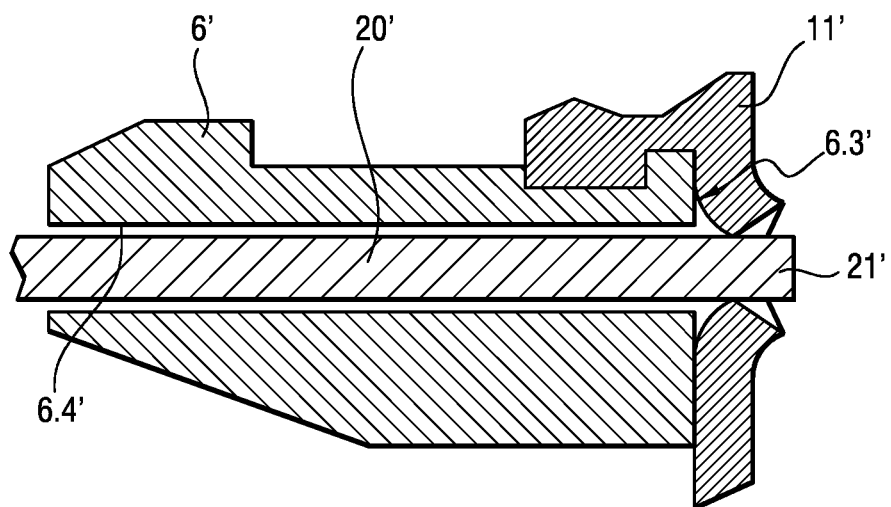
FIG. 7a is a detailed view of the connection device according to the third embodiment of the invention, awaiting a tube, represented as a longitudinal cross-section according to a first section plane.
Figure 7B:
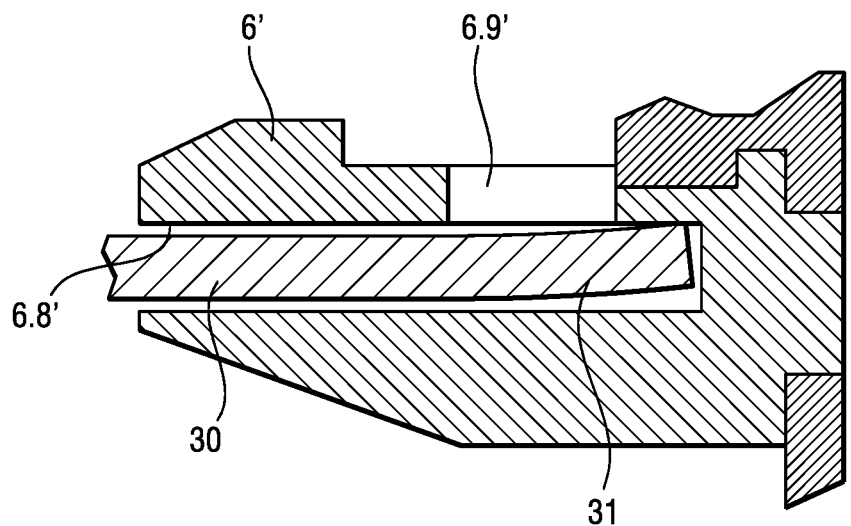
FIG. 7b is a detailed view of the connection device according to the third embodiment of the invention, awaiting a tube, represented as a longitudinal cross-section according to a second section plane perpendicular to the first section plane.
Figure 8A:
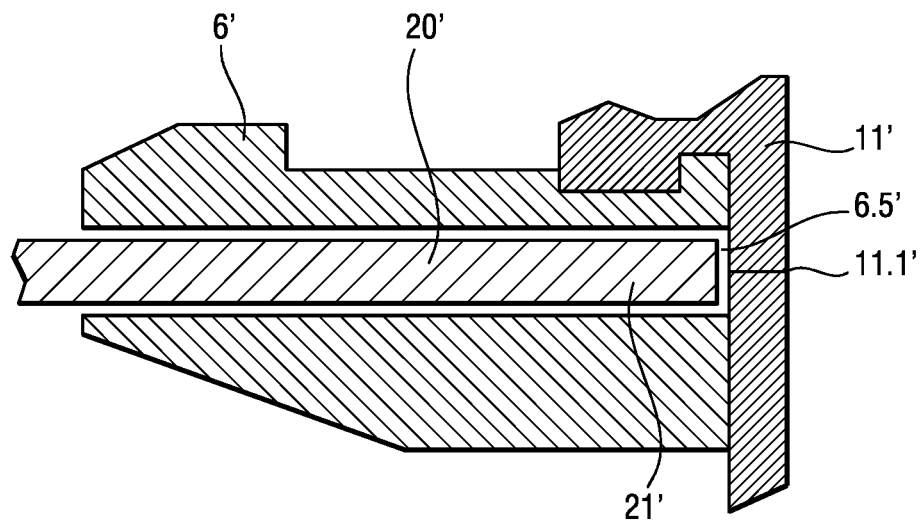
FIG. 8a is a detailed view of the connection device according to the third embodiment of the invention, at the end of connection of the tube, represented as a longitudinal cross-section according to a first section plane.
Figure 8B:
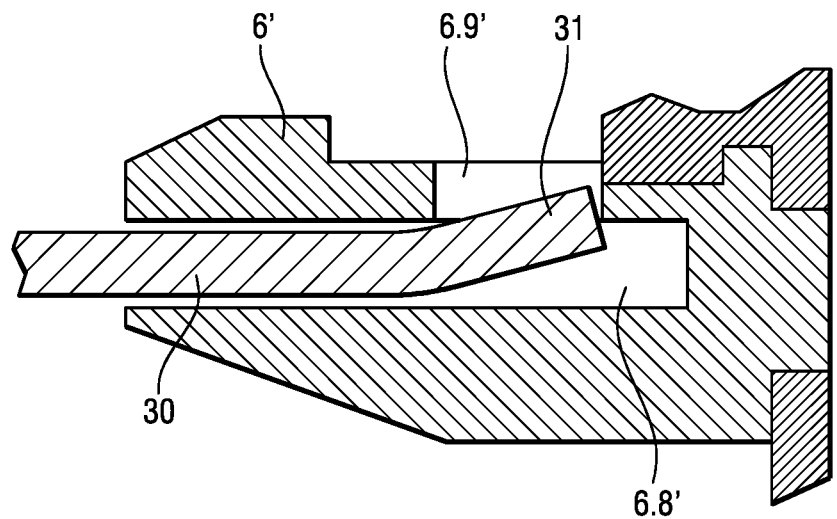
FIG. 8b is a detailed view of the connection device according to the third embodiment of the invention, at the end of connection of the tube, represented as a longitudinal cross-section according to a second section plane perpendicular to the first section plane.
Figure 9A:
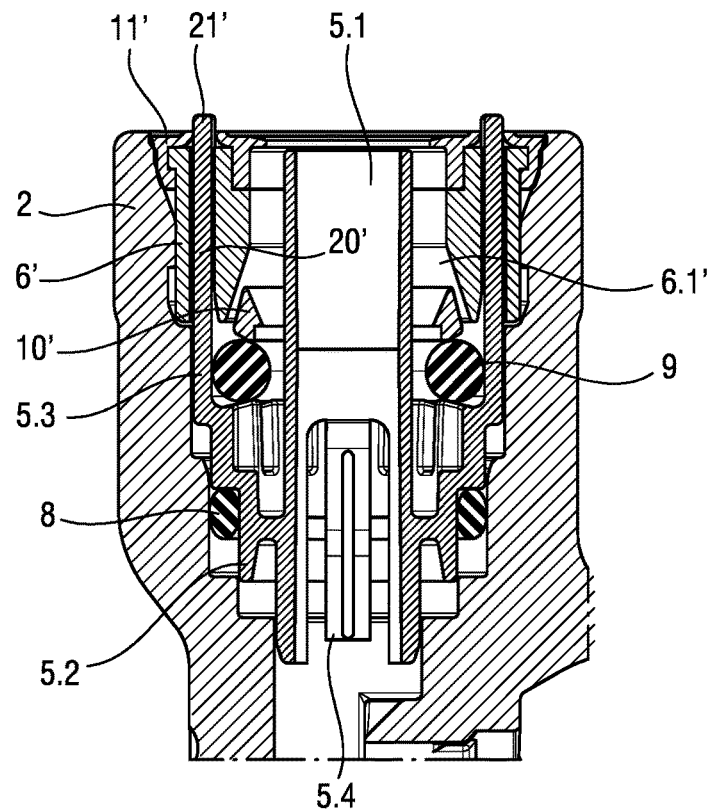
FIG. 9a is a partial view of the connection device according to the third embodiment of the invention, awaiting a tube, represented as a longitudinal cross-section according to a first section plane.
Figure 9B:
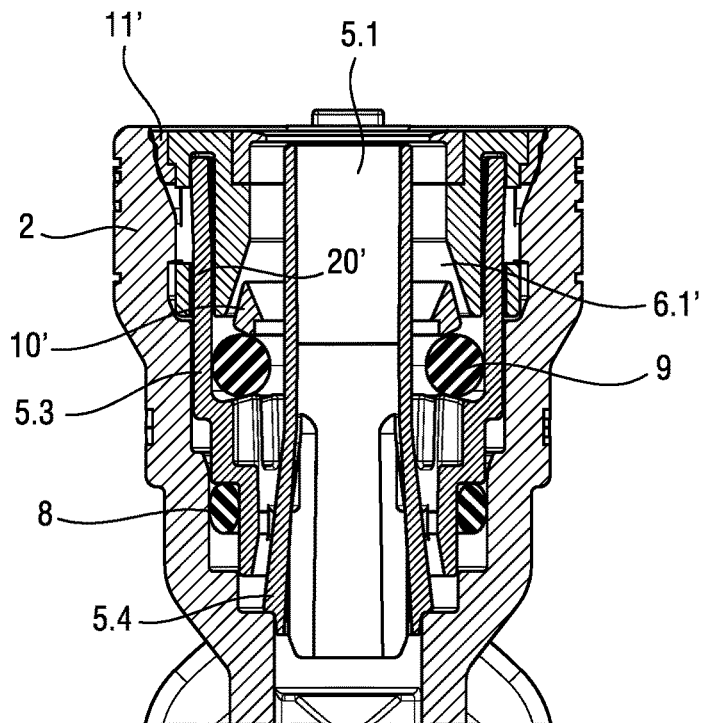
FIG. 9b is a partial view of the connection device according to the third embodiment of the invention, awaiting a tube, represented as a longitudinal cross-section according to a second section plane perpendicular to the first section plane.
Figure 10A:
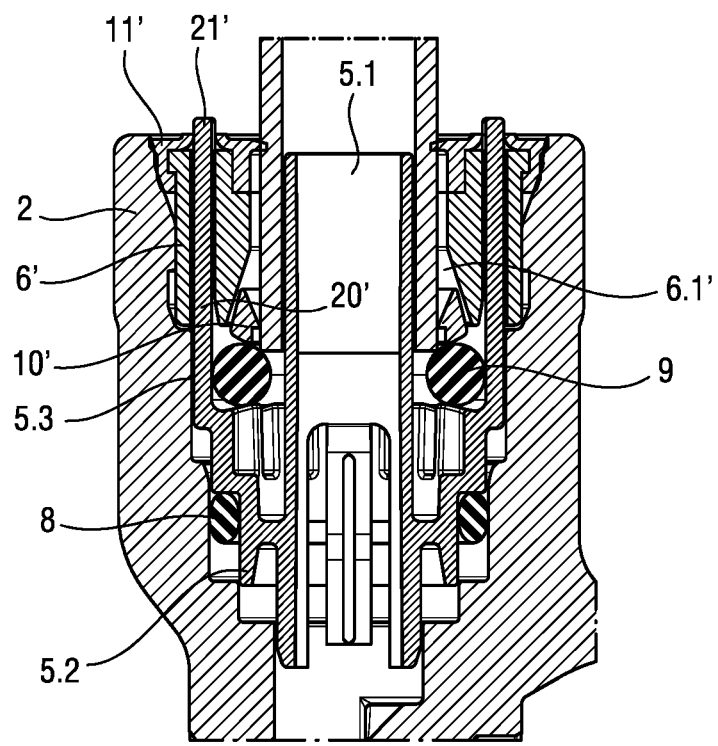
FIG. 10a is a partial view of the connection device according to the third embodiment of the invention, at the start of connection of a tube, represented as a longitudinal cross-section according to a first section plane.
Figure 10B:
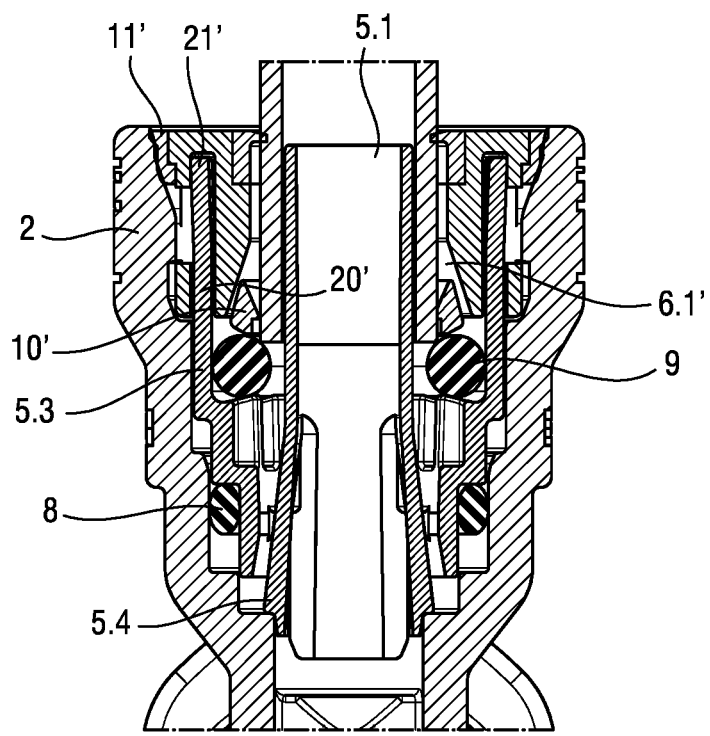
FIG. 10b is a partial view of the connection device according to the third embodiment of the invention, at the start of connection of a tube, represented as a longitudinal cross-section according to a second section plane perpendicular to the first section plane.

The free end of the external socket 5.3 of the bushing 5 is also provided with two second axial arms 30 having a free end 31. The second axial arms 30 are diametrically opposite one another and are inserted between the first axial arms 20'. The second axial arms 30 are elastically deformable between a deformed state in which the free ends 31 are close to the central axis of the external socket 5.3 and a rest state in which the free ends 31 are spaced apart from the central axis of the external socket 5.3. The second axial arms 30, shorter than the first axial arms 20', are received in axial conduits 6.8' of the insert 6'. The second axial arms 30:

- are held in their deformed state by the walls of the conduits 6.8' of the insert 6' when the bushing 5 is in its standby position (FIGS. 5 and 7), and
- have, when the bushing 5 is in the operating position, their free ends 31 facing orifices 6.9' opening into the conduits 6.8' and enabling an elastic return of the second axial arms 30 toward their rest state such that the free ends 31 are projecting into said orifices 6.9' (FIGS. 6 and 8).

The seal 11' has the shape of a cap covering the end of the body 2 in which the insert 6' is inserted. The seal 11' is pierced with a central opening for the passage of the tube T and slots 11.1' in vertical alignment with the openings 6.5' and can comprise an edge sandwiching an annular portion of the side wall of the body 2 or be overmoulded on the insert 6'.

Thus, before any connection (FIG. 9a, b), the bushing 5 is in the standby position and the free ends 21' of the arms 20' project through the openings 6.5' and the slots 11.1'.

As above, at the start of the connection (FIG. 10a, b), the end section of the tube T is simultaneously engaged on the free end of the internal socket 5.1 and in the dust-resistant seal 11', the bushing 5 being held in the standby position by the legs 5.4 pressing against the bottom of the counterbore 3.2 in the vicinity of the outlet of the main section 3.3.

Figure 11A:
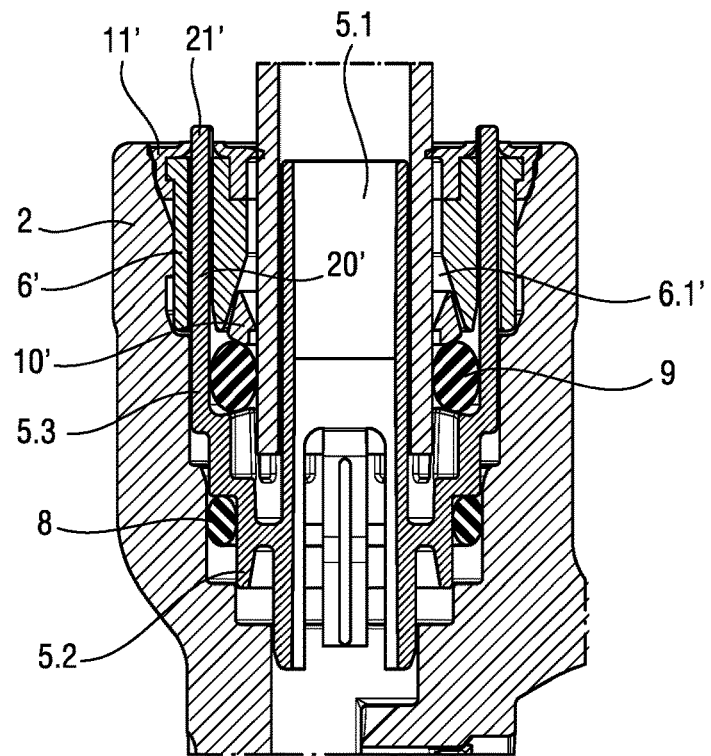
FIG. 11a is a partial view of the connection device according to the third embodiment of the invention, during connection of the tube, represented as a longitudinal cross-section according to a first section plane.
Figure 11B:
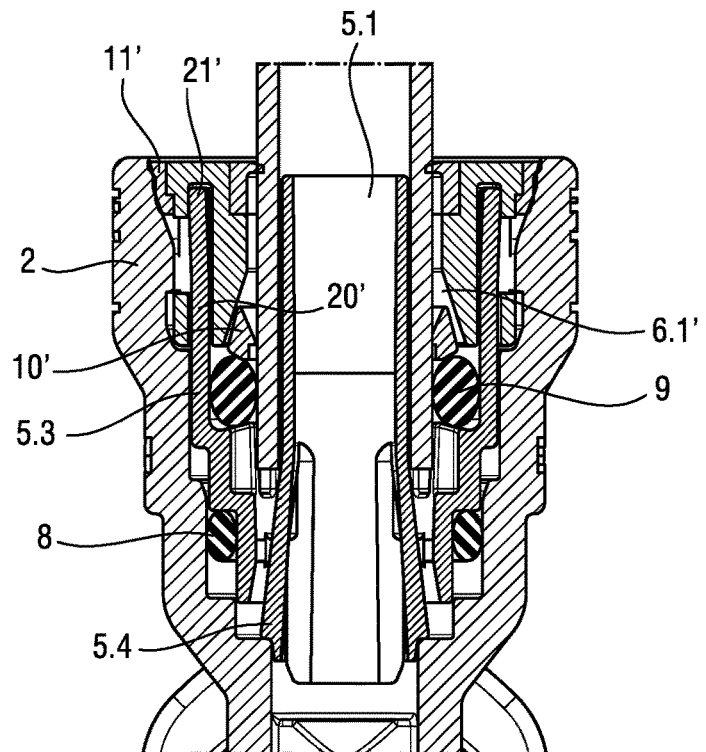
FIG. 11b is a partial view of the connection device according to the third embodiment of the invention, during connection of the tube, represented as a longitudinal cross-section according to a second section plane perpendicular to the first section plane.

The recessing force of the tube T being continued, the end section of the tube T passes into the hooking ring 10' and into the seal 9, the bushing 5 being held in the standby position by the legs 5.4 pressing against the bottom of the counterbore 3.2 (FIG. 11a, b).

Figure 12A:
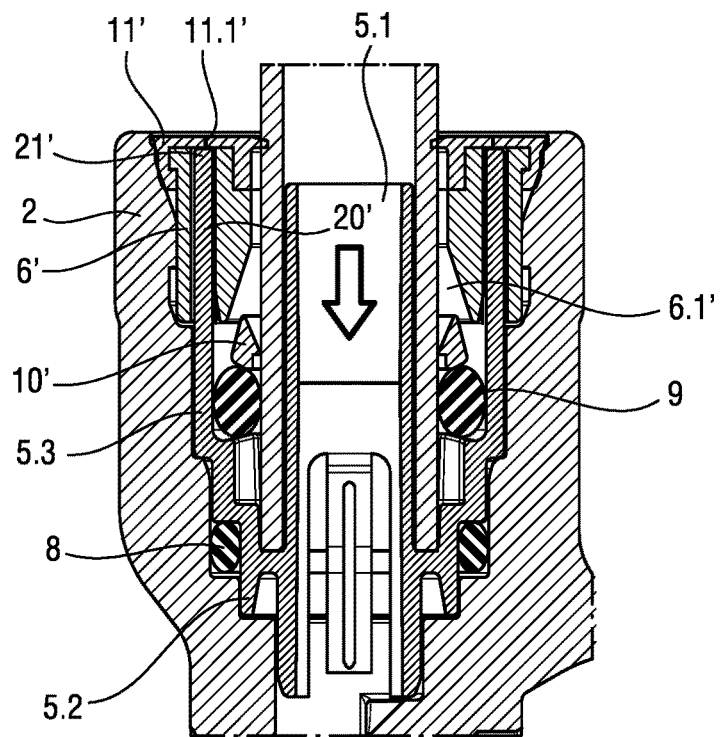
FIG. 12a is a partial view of the connection device according to the third embodiment of the invention, at the end of connection of the tube, represented as a longitudinal cross-section according to a first section plane (a) and as a longitudinal cross-section according to a second section plane perpendicular to the first.
Figure 12B:
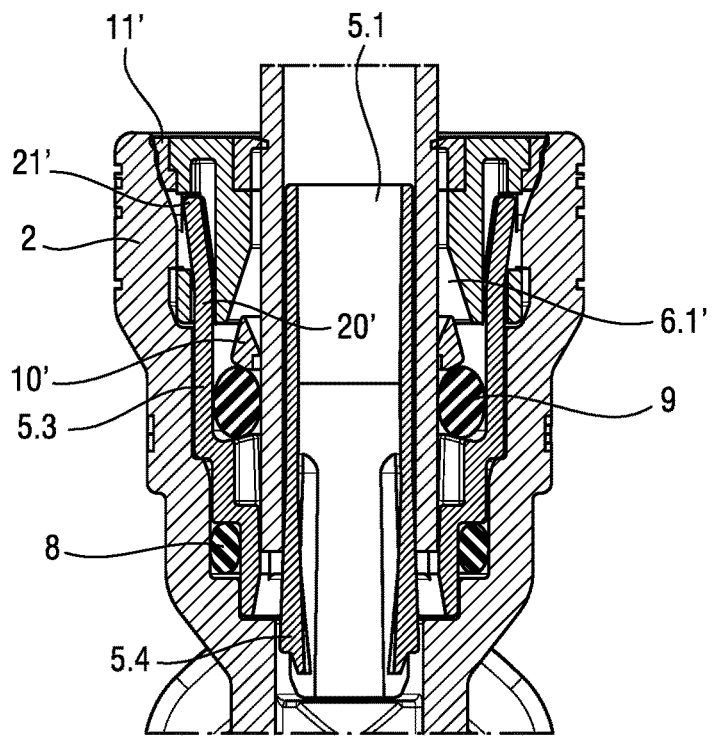
FIG. 12b is a partial view of the connection device according to the third embodiment of the invention, at the end of connection of the tube, represented as a longitudinal cross-section according to a second section plane perpendicular to the first section plane.

The recessing force of the tube T being continued, the end section of the tube T progressively covers the legs 5.4 and tends to elastically deform them to fold them back toward the central axis of the body 2, until forcing the folding back of the legs 5.4 which thus escape, pressing against the bottom of the counterbore 3.2 and return into the main section 3.3. This folding back of the legs 5.4 enables the movement of the bushing 5 toward the operating position. The movement of the bushing 5 is relatively sudden and ends when the bushing 5 stops against the bottom of the counterbore 3.2 (FIGS. 12a and b).

Simultaneously, the free ends 21' of the arms 20' are retracted and the slots 11.1' close while the free ends 31 arrive facing the orifices 6.9' such that the second axial arms 30 elastically return to their rest state, striking the wall of the insert 6' in the surroundings of the orifice 6.9'. It is noted that the slots 11.1' are defined by two lips in contact with one another when the ends 21' are retracted, which has two advantages: the dust-resistant seal 11' prevents dust getting in via the openings 6.9' and conceals the ends 21' in full view. The free end 21' is thus movable between a visible position in which the free end 21' can be seen from the outside of the body 2 and a retracted position in which the free end 21' is concealed from the outside of the body 2.

As above, the arrival of the bushing 5 in the second recessing position activates at least one connection control. In this third embodiment, there are several connection controls:

- the bushing 5 and the body 2 are made of materials such that the arrival of the bushing 5 stopped against the bottom of the counterbore 3.2 (in the operating position) causes a sound constituting a connection control;
- the free ends 21' extend projecting from the insert 6' and from the dust-resistant seal 11' when the bushing 5 is in the standby position and are received completely in the conduits 6.4' when the bushing 5 is in its operating position, such that the first axial arms 20' constitute both a tactile connection control and a visual connection control. The first axial arms 20' and the dust-resistant seal 11' preferably have contrasting colours to strengthen the visual signal constituted by the retraction of the free ends 21' in the conduits 6.4';
- due to the elasticity of the second axial arms 30, the second axial arms 30, in the vicinity of their free ends 31, strike the wall of the conduits 6.8' in the vicinity of the orifices 6.9' when the bushing 5 arrives in its operating position. The second axial arms 30 and the insert 6' are made of materials such that the impact of the second axial arms 30 against the wall of the conduits 6.8' causes a sound constituting a sound connection control.

Figure 13A:
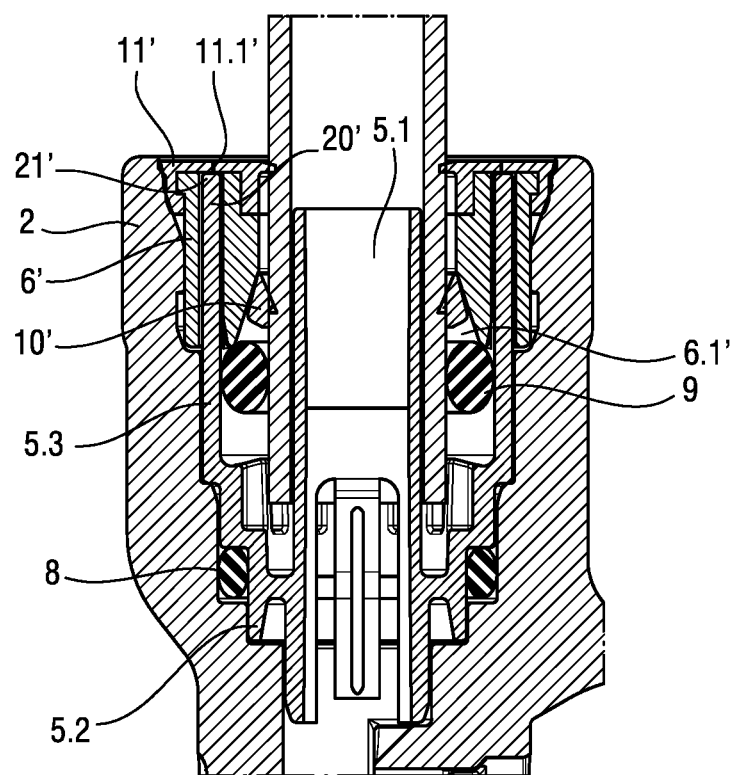
FIG. 13a is a partial view of the connection device according to the third embodiment of the invention, after the pressurising of the circuit, represented as a longitudinal cross-section according to a first section plane.
Figure 13B:
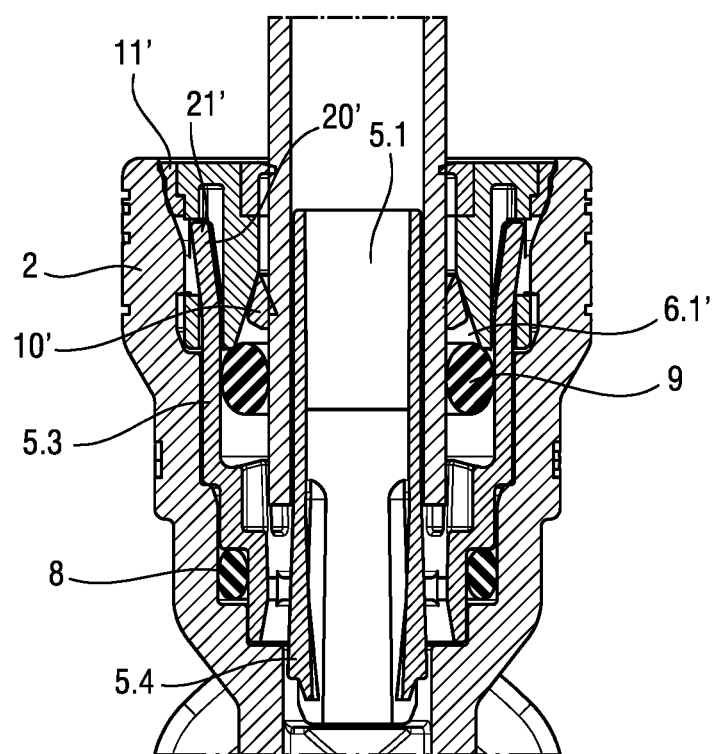
FIG. 13b is a partial view of the connection device according to the third embodiment of the invention, after the pressurising of the circuit, represented as a longitudinal cross-section according to a second section plane perpendicular to the first section plane.

Upon pressurising the circuit, the tube T will slightly go backward under the effect of the fluid pressure, but will be, as above, held in the insert 6' by the hooking ring 10' which will slide against the truncated surface of the shoulder 6.1' increasing the clamping of the hooking ring 10' on the tube T (FIGS. 13a and b).

Naturally, the invention is not limited to the implementations described, but covers any variant coming within the ambit of the invention as defined by the claims.

In particular, the tubular body can have a structure different from that described, likewise the means for ensuring the sealing of the connection and the securing of the tube end. It is thus possible to have an instantaneous connection by means of a clamp, a radial bolt or a toothed washer, or a non-instantaneous connection by screwing or otherwise. It is possible to provide a deconnection pushbutton to act on the hooking element so as to be able to extract the tube T.

The retaining means can be supported or not by an insert, integral in translation with the bushing.

The insert cannot be integral in translation with the bushing.

The anchoring element of the insert can be arranged to oppose an extraction of the insert outside of the channel in only one of the positions of the bushing. It is possible to have one anchoring element per position.

The invention applies to devices without bushing.

The bushing 5 can comprise one or more legs 5.4. The leg(s) can have a shape and/or an arrangement different from those described.

The leg 5.4 is arranged to press against a projection of the channel 2 when the bushing 5 is in the standby position so as to oppose the movement of the bushing 5 toward the operating position. The projection can be formed by the stop at the recessing of the bushing 5 in the channel 2 beyond the operating position, or by a projection separate from this stop.

The invention claimed is:

1. A connecting device of a tube end section, comprising:
   a tubular body defining a channel provided with retaining means, including a hooking element for engaging an outer surface of the tube end section, and an annular seal for gripping the outer surface of the tube end section, characterized in that the device comprises at least a first arm having an end arranged in the channel to be actuated by the tube end section downstream of the retaining means so as to make a portion of the arm a connection indicator which is detectable from outside the body and a free end which is movable in a substantially axial direction between a visible position in which the free end can be seen from the outside of the body and a retracted position in which the free end is concealed from the outside of the body;
wherein the substantially axial direction corresponds to a direction of insertion of the tube end section in the body.

2. The device according to claim 1,
wherein the free end projects outside the body through an opening arranged in an insert;
wherein the insert is fixed to an inlet of the channel; and
wherein the insert is configured to retain the retaining means.

3. The device according to claim 2,
wherein a dust-resistant seal covers a front face of the body and of the insert;
wherein the dust-resistant seal comprising, facing the opening, a slot delimited by two lips;
wherein the two lips are elastically in contact with each other when the free end is in the retracted position; and
wherein the two lips moves apart from each other when the free end arrives in the visible position.

4. The connecting device according to claim 1, further comprising:
a bushing mounted in the channel to slide between a standby position and a recessed operating position;
wherein the bushing has a recessing;
wherein in the standby position, the bushing is spaced apart from a stop at the recessing in the channel; and
wherein in the recessed operating position, the bushing presses against the stop; and,
wherein the bushing is configured to be engaged in the tube end section when the bushing is in the standby position and to be moved towards its recessed position when the tube end section has passed the retaining means.

5. The connecting device according to claim 4, wherein the bushing comprises:
at least a leg downstream from the retaining means by reference to the direction of insertion of the tube end section in the body;
wherein the at least a leg is configured to press against a projection of the channel when the bushing is in the standby position; and
wherein the at least a leg is configured to oppose the movement of the bushing toward the operating position; and
wherein the at least a leg is configured to be retracted by the tube end section when the bushing is engaged in the tube end section over a predetermined length.

6. A connecting device of a tube end section, comprising:
a tubular body defining a channel provided with retaining means, including a hooking element for engaging an outer surface of the tube end section, and an annular seal for gripping the outer surface of the tube end section, characterized in that the device comprises at least a first arm having an end arranged in the channel to be actuated by the tube end section downstream of the retaining means so as to make a portion of the arm a connection indicator which is detectable from outside the body and a free end which is movable in a substantially axial direction between a visible position in which the free end can be seen from the outside of the body and a retracted position in which the free end is concealed from the outside of the body;
wherein the free end projects outside the body through an opening arranged in an insert;
wherein the insert is fixed to an inlet of the channel;
wherein the insert is configured to retain the retaining means;
wherein a dust-resistant seal covers a front face of the body and of the insert;
wherein the dust-resistant seal comprising, facing the opening, a slot delimited by two lips;
wherein the two lips are elastically in contact with each other when the free end is in the retracted position; and
wherein the two lips move apart from each other when the free end arrives in the visible position.

* * * * *